United States Patent
Fayette et al.

(10) Patent No.: US 11,875,492 B1
(45) Date of Patent: Jan. 16, 2024

(54) SYSTEMS AND METHODS FOR DIGITAL COMPOSITING

(71) Applicant: FD IP & LICENSING LLC, Los Angeles, CA (US)

(72) Inventors: Brandon Fayette, Los Angeles, CA (US); Gene Reddick, San Francisco, CA (US)

(73) Assignee: FD IP & LICENSING LLC, Los Angeles, CA (US)

( * ) Notice: Subject to any disclaimer, the term of this patent is extended or adjusted under 35 U.S.C. 154(b) by 0 days.

(21) Appl. No.: 18/309,978

(22) Filed: May 1, 2023

(51) Int. Cl.
*G06T 5/50* (2006.01)
*G06T 1/60* (2006.01)
*G06V 40/16* (2022.01)
*G06V 40/20* (2022.01)
*G06T 17/00* (2006.01)

(52) U.S. Cl.
CPC ............... *G06T 5/50* (2013.01); *G06T 1/60* (2013.01); *G06T 17/00* (2013.01); *G06V 40/174* (2022.01); *G06V 40/23* (2022.01); *G06T 2207/20221* (2013.01)

(58) Field of Classification Search
CPC ........ G06V 40/174; G06V 40/23; G06T 1/60; G06T 5/50; G06T 17/00; G06T 2207/20221
USPC .................................................. 345/545, 557
See application file for complete search history.

(56) References Cited

U.S. PATENT DOCUMENTS

| | | | |
|---|---|---|---|
| 6,243,791 B1 * | 6/2001 | Vondran, Jr. | ........ G06F 12/0846 711/123 |
| 7,693,702 B1 | 4/2010 | Kerner et al. | |
| 8,264,505 B2 | 9/2012 | Bathiche et al. | |
| 8,743,145 B1 | 6/2014 | Price | |
| 8,743,244 B2 | 6/2014 | Vartanian et al. | |
| 8,896,629 B2 | 11/2014 | Meier et al. | |
| 8,930,577 B2 * | 1/2015 | Ostergren | ............... H04L 65/61 709/248 |
| 8,937,663 B2 | 1/2015 | Sugden | |
| 8,943,420 B2 | 1/2015 | Goldthwaite et al. | |
| 8,953,022 B2 | 2/2015 | Mcardle et al. | |
| 9,030,492 B2 | 5/2015 | Bischoff et al. | |
| 9,070,216 B2 | 6/2015 | Golparvar-Fard et al. | |
| 9,122,321 B2 | 9/2015 | Perez et al. | |

(Continued)

OTHER PUBLICATIONS

International Search Report and Written Opinion dated Nov. 30, 2021 of PCT/US2021/047327, International Filing Date of Aug. 24, 2021, Applicant FD IP & Licensing LLC, Authorized Officer Kari Rodriquez, Forms PCT/ISA/220, PCT/ISA/210, and PCT/ISA/237, 16 pages.

*Primary Examiner* — Jacinta M Crawford
(74) *Attorney, Agent, or Firm* — Vorys, Sater, Seymour and Pease LLP; Mark A. Watkins

(57) ABSTRACT

Systems and methods are described for digital compositing. In an example, a video frame from video frames stored in memory can be identified based on video frame latency data. The video frame latency data can specify a number of video frames to be stored in the cache memory space before the video frame is selected. A scene related information frame of the scene related information frames stored in the memory can also be identified based on a timecode of the video frame. Augmented video data that includes one or more composited video frames can be provided based on the video frame and the scene related information frame.

16 Claims, 6 Drawing Sheets

(56) References Cited

U.S. PATENT DOCUMENTS

| | | |
|---|---|---|
| 9,164,577 B2 | 10/2015 | Tapley et al. |
| 9,196,094 B2 | 11/2015 | Ur |
| 9,215,293 B2 | 12/2015 | Miller |
| 9,349,218 B2 | 5/2016 | Keating et al. |
| 9,361,730 B2 | 6/2016 | Keating et al. |
| 9,380,177 B1 | 6/2016 | Rao et al. |
| 9,489,773 B2 | 11/2016 | Damola |
| 9,495,760 B2 | 11/2016 | Swaminathan et al. |
| 9,506,744 B2 | 11/2016 | Bridges |
| 9,589,372 B1 | 3/2017 | Bean et al. |
| 9,600,933 B2 | 3/2017 | Wu et al. |
| 9,626,803 B2 | 4/2017 | Park et al. |
| 9,665,983 B2 | 5/2017 | Spivack |
| 9,717,981 B2 | 8/2017 | Robbins et al. |
| 9,721,394 B2 | 8/2017 | Rosenthal et al. |
| 9,728,007 B2 | 8/2017 | Hakkarainen |
| 9,728,011 B2 | 8/2017 | Lam |
| 9,741,170 B2 | 8/2017 | Park et al. |
| 9,779,550 B2 | 10/2017 | Tobita |
| 9,792,733 B2 | 10/2017 | Rosenthal et al. |
| 9,846,972 B2 | 12/2017 | Montgomerie et al. |
| 10,203,762 B2 | 2/2019 | Bradski et al. |
| 10,388,070 B2 | 8/2019 | Spivak |
| 10,594,786 B1 | 3/2020 | Perez, III et al. |
| 2005/0046707 A1* | 3/2005 | Takane ............... H04N 23/667 386/E5.072 |
| 2017/0208220 A1* | 7/2017 | Stankoski ............ H04N 5/0736 |
| 2018/0270516 A1* | 9/2018 | Dalbec ............... H04N 21/4622 |
| 2019/0035149 A1 | 1/2019 | Chen et al. |
| 2019/0066365 A1 | 2/2019 | Schmalstieg et al. |
| 2019/0066387 A1* | 2/2019 | Grossmann ............ G06F 3/011 |
| 2019/0082211 A1 | 3/2019 | Vats |
| 2019/0297304 A1 | 9/2019 | Li |
| 2023/0217084 A1* | 7/2023 | Shibata .................. G06T 13/20 725/115 |

* cited by examiner

SYSTEMS AND METHODS FOR DIGITAL COMPOSITING

FIELD OF THE DISCLOSURE

This disclosure relates generally to filmmaking, and more particularly, to systems and methods for digital compositing.

BACKGROUND OF THE DISCLOSURE

Compositing is a process or technique of combining visual elements from separate sources into single images, often to create an illusion that all those elements are parts of the same scene. Today, most, though not all, compositing is achieved through digital image manipulation. All compositing involves replacement of selected parts of an image with other material, usually, but not always, from another image. In a digital method of compositing, software commands designate a narrowly defined color as the part of an image to be replaced. Then the software replaces every pixel within the designated color range with a pixel from another image, aligned to appear as part of the original. Visual effects (sometimes abbreviated as VFX) is the process by which imagery is created or manipulated outside the context of a live-action shot in filmmaking and video production. VFX involves the integration of live-action footage (which may include in-camera special effects) and other live-action footage or computer-generated imagery (CGI) (digital or optics, animals or creatures) which look realistic, but would be dangerous, expensive, impractical, time-consuming or impossible to capture on film.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

In an example, a computer implemented method can include identifying a video frame from video frames stored in a cache memory space based on video frame latency data. The video frame latency data can specify a number of video frames to be stored in the cache memory space before the video frame is selected. The method can further include identifying a scene related information frame of the scene related information frames based on a timecode of the video frame, and providing a composited video frame based on the video frame and the scene related information frame.

In another example, a system for providing augmented video data can include memory to store machine-readable instructions and data, and one or more processors to access the memory and execute the machine-readable instructions. The machine-readable instructions can include a video frame retriever to identify a video frame from video frames based on video frame latency data. The video frame latency data can specify a number of video frames to be stored in the memory before the video frame is selected. The machine-readable instruction can further include a scene related frame retriever to identify a scene related information frame of scene related information frames based on a timecode of the video frame, a digital asset retriever to retrieve digital asset data characterizing a digital asset, and a digital compositor to provide the augmented video data with the digital asset based on the digital asset data, the scene related information frame, and the video frame.

In a further example, a computer implemented method can include identifying a video frame from video frames provided by a video camera representative of a scene during filming production based on video frame latency data. The video frame latency data can specify a number of video frames to be stored in memory of a computing platform before the video frame is selected. The method can further include identifying a scene related information frame of scene related information frames provided by scene capture devices based on an evaluation of a timecode of the video frame relative to a timestamp of the scene related information frames. The timestamp for the scene related information frames can be generated based on a frame delta value representative of an amount of time between each scene related information frame provided by a respective scene capture device of the scene capture devices. The method can further include providing augmented video data with a digital asset based on the scene related information frame and the video frame.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Embodiments are described with reference to the accompanying drawings. In the drawings, like reference numbers can indicate identical or functionally similar elements. The drawing in which an element first appears is generally indicated by the left-most digit in the corresponding reference number.

DETAILED DESCRIPTION

Figure 1:
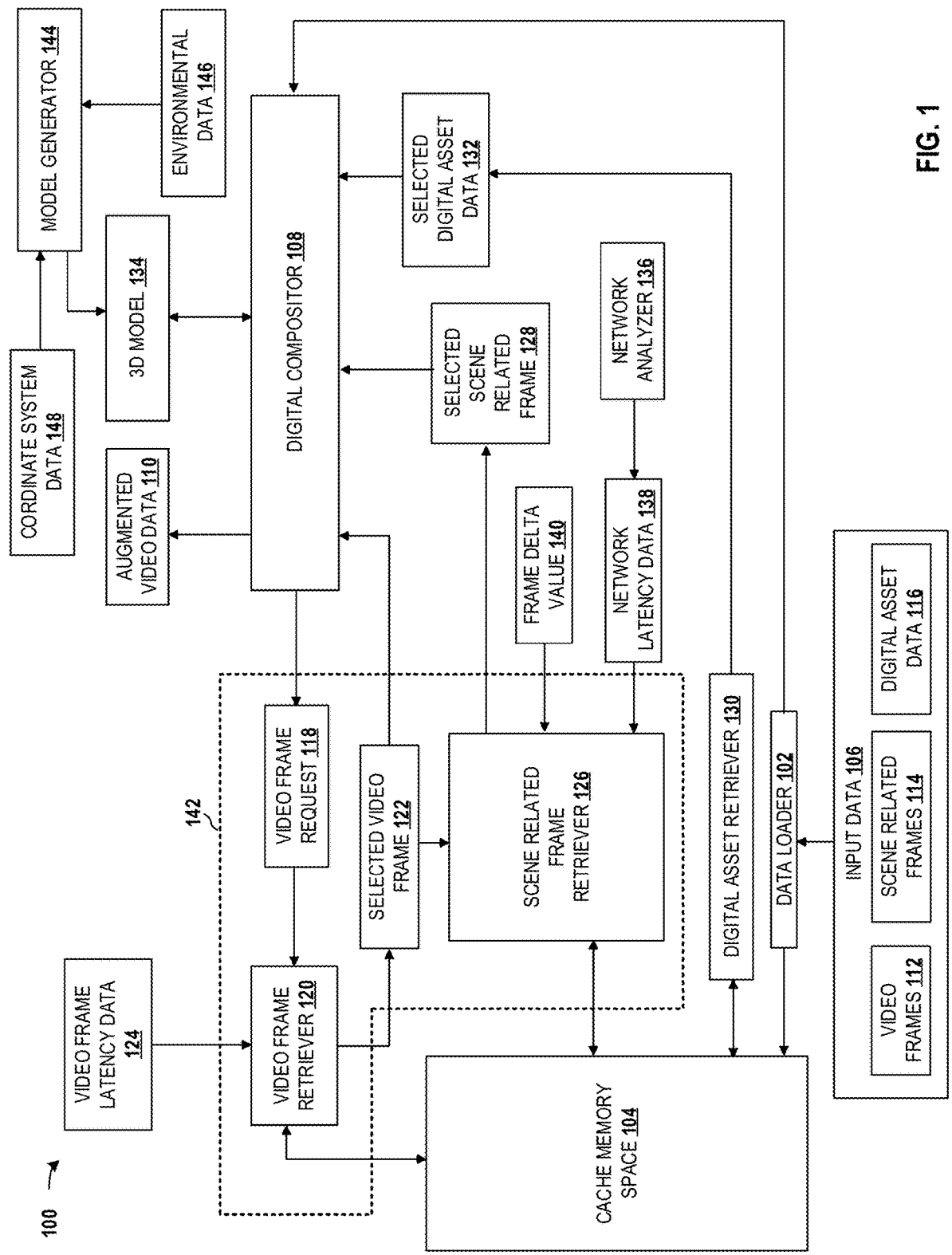
FIG. 1 is a block diagram of an example of a compositing engine that can be used for digital compositing during production.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Examples are disclosed herein for digital compositing during filming of a scene (also known as production). As video data and other related scene information (needed for digital compositing) arrives at a compositing device (also known as a compositor), in some instances, the compositor may not use most relevant scene data. This can introduce visual problems into composited video data provided by the compositor during filming. Because the compositor may receive data at different times (because different devices are used to provide the data over a network), in some instances, movements of a digital asset may not be properly synchronized with video footage. CGI synchronization issues can result in a number of visual problems that can make the CGI asset look unconvincing, or unrealistic during filming. Such visual problems can include, for example, unnatural movement, timing issues, lighting and shadow issues, and/or scale and perspective issues.

Visual problems can be problematic during on-set filming, for example, during complex VFX scenes as timing and choreography of actions need to be synchronized so that a director's vision or expectation can be met. Additionally, visual problems can also make it difficult to film, as it can be distracting, as well as propagate production errors downstream (e.g., to post production), requiring production teams to expedite resources to correct these errors. For example, if a particular VFX shot did not turn out as planned or there were mistakes in original footage, a VFX team would need to expend resources (e.g., computing processing resources) to identify the errors/mistakes and correct these issues post production.

Examples are disclosed herein in which a data manager is used for digital compositing that can identify relevant scene related information data and modify timing of the scene related information data so that visual problems can be mitigated or eliminated in composited video data (or augmented video data), such as during on-set filming. By implementing the systems and methods herein, real-time (or near real-time (e.g., sub-second delay)) can be achieved at the outset (e.g., during pre-production). Because the systems and methods disclosed herein combine different filming techniques in combination with manage data timing of diverse data source devices (or systems) that communicate over a communication network enables (or allows) film makers or production (e.g., teams) to see filming results (with sub-second delay), and use those results to inform performance and capture. While systems and methods are presented herein relating to production, the examples herein should not be construed and/or limited to only production. The systems and methods disclosed herein can be used in any application in which visual problems need to be corrected, which can include post-production.

Figure 2:
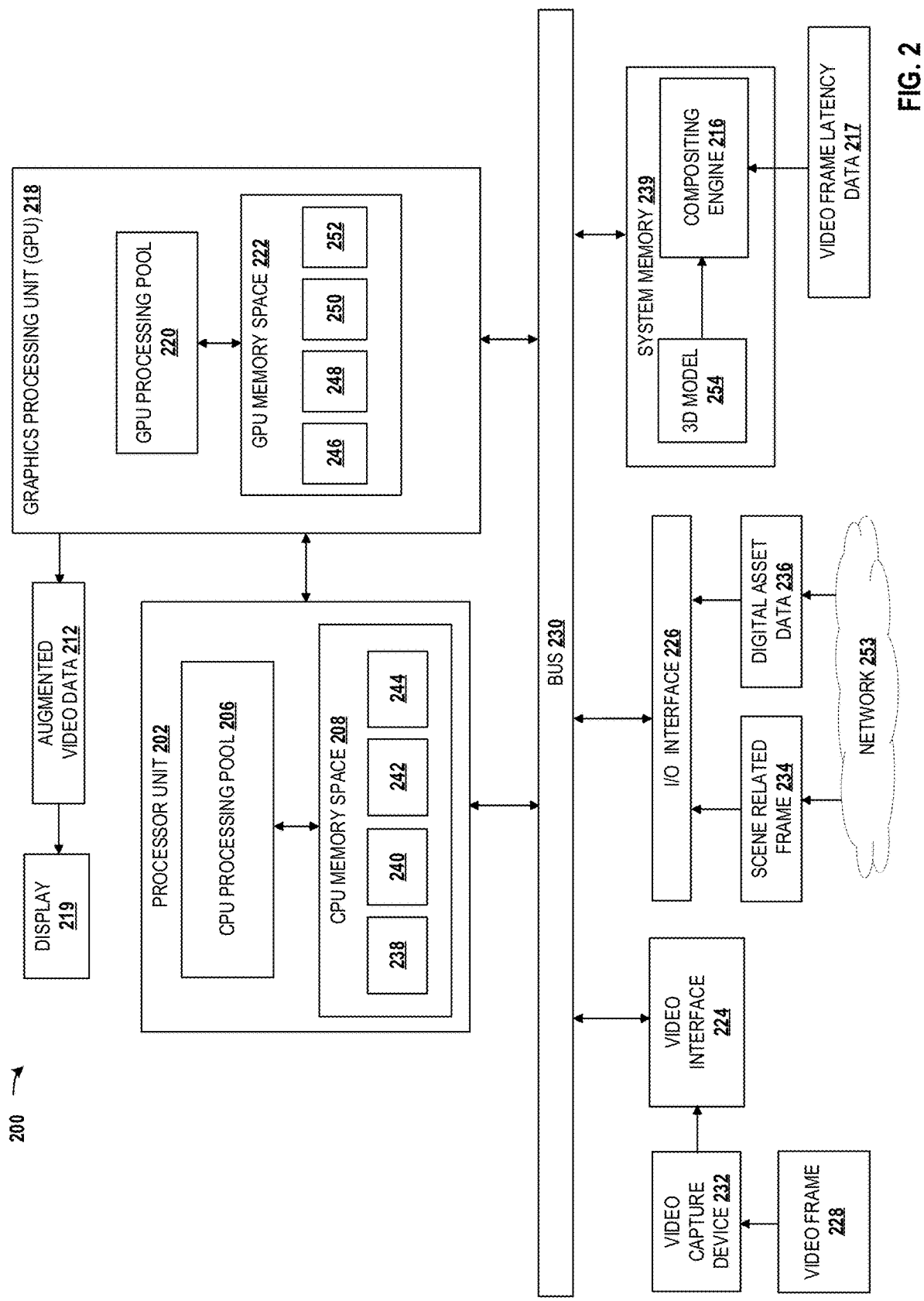
FIG. 2 is a block diagram of an example of a computing platform.
Figure 3:
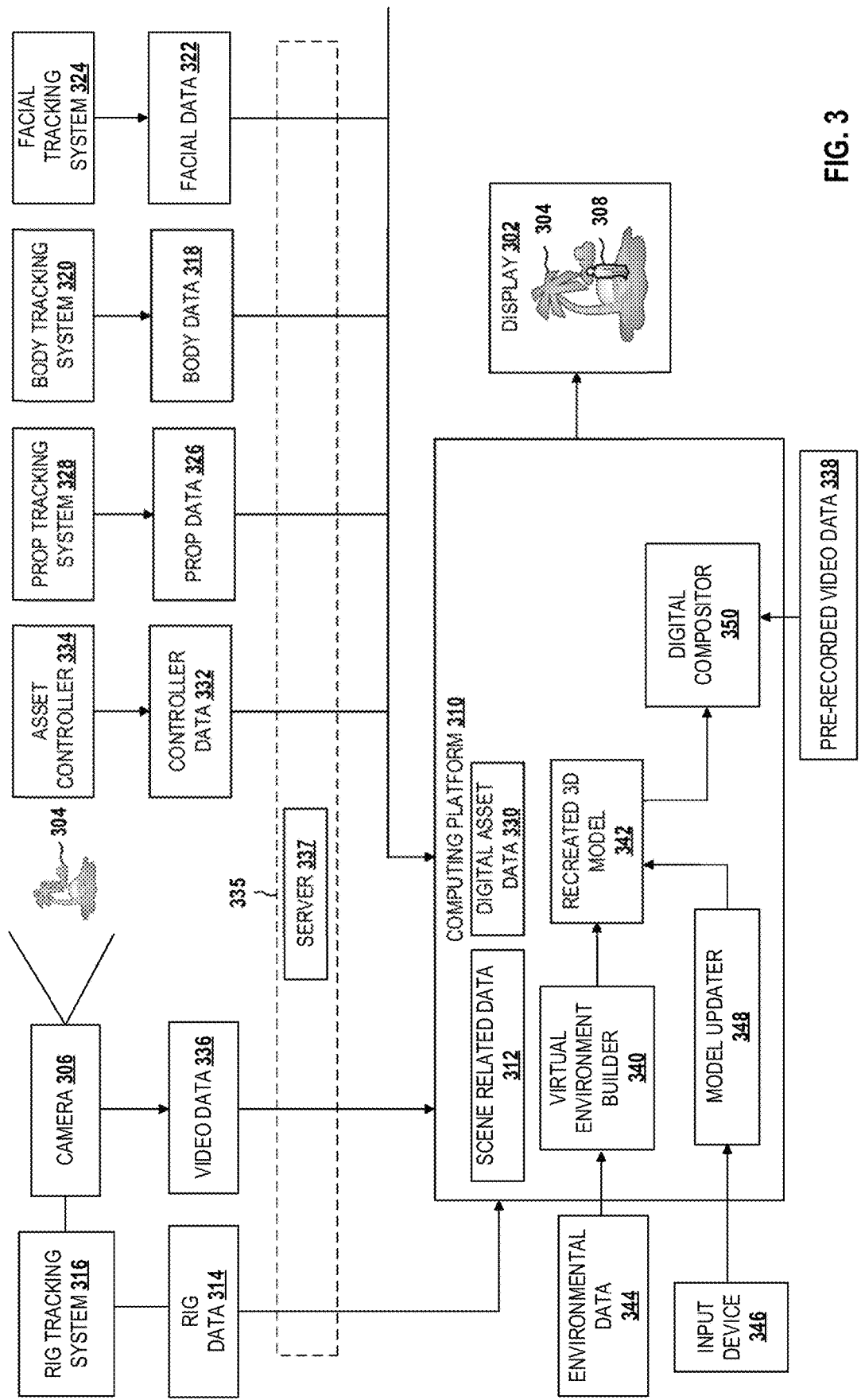
FIG. 3 is a block diagram of an example of a system for visualizing CGI video scenes.
Figure 6:
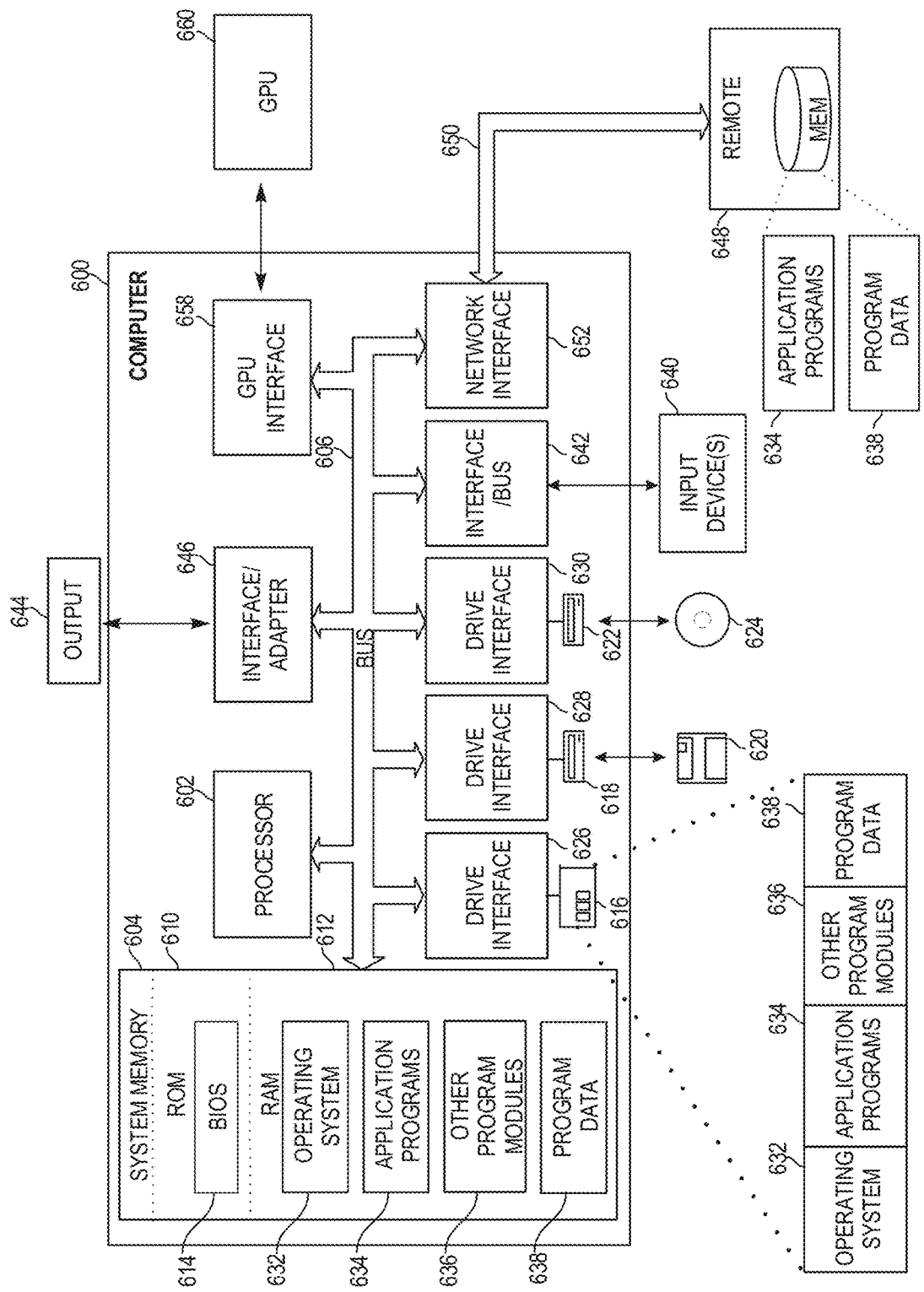
FIG. 6 depicts an example computing environment that can be used to perform methods according to an aspect of the present disclosure.

FIG. 1 is a block diagram of an example of a compositing engine 100 that can be used for digital compositing during production. The compositing engine 100 can be executed on a computing device, such as a computing platform (e.g., a computing platform 200, as shown in FIG. 2, or a computing platform 310, as shown in FIG. 3), or on a computing system (e.g., a computing system 600, as shown in FIG. 6). The compositing engine 100 can include a data loader 102. The data loader 102 can partition a cache memory space 104 for storage of input data 106 corresponding to data that is to be used by a digital compositor 108 of the compositing engine 100 for generating augmented video data 110. For example, the data loader 102 can partition the cache memory space 104 into a number of cache locations (or partitions) for storing video frames 112, scene related information frames 114, and digital asset data 116 for the scene.

The data loader 102 can store the video frames 112 in a first set of partitions of the partitions of the cache memory space 104, the scene related information frames 114 in a second set of partitions of the cache memory space 104, and the digital asset data 116 in a third set of partitions of the cache memory space 104. In some examples, the first set of partitions can include even and odd video frame cache locations, and each video frame of the video frames 112 can be stored in one of the even and odd video frame cache locations based on respective frame numbers of the video frames. In some examples, the video frames 112 are provided during production, such as from a video camera (e.g., a digital video camera), and thus in real-time as the scene is being shot. In other examples, the video frames 112 are provided from a storage device, for example, during post-production. Thus, in some instances, the compositing engine 100 can be used during post-production to provide the augmented video data 110.

The scene related information frames 114 can be provided over a network from different types of scene capture devices used for capturing information relevant to a filming of the scene being captured by a video camera. The video frames 112 are provided by the video camera. The network can be a wired and/or wireless network. Each scene related information frame of the scene related information frames 114 can include a timestamp generated based on a local clock of the respective scene capture device. The video frames can be provided by the video camera at a different frequency than the scene related information frames 114 are being provided by the scene capture devices.

The term "frame" as used herein can represent or refer to a discrete unit of data. Thus, in some examples, the term frame as used herein can refer to a video frame (e.g., one or more still images that have been captured or generated by the video camera), or a data frame (e.g., a pose data frame). By way of example, a respective scene related information frame of the scene related information frames 114 can include camera pose data for the video camera that provides the video frames 112. Pose data for a video camera typically refers to the position and orientation of the camera at a particular moment in time, expressed in a three-dimensional (3D) space. It typically includes information such as the camera's location, orientation, and field of view, as well as other relevant parameters such as focal length, aperture, and shutter speed. In some examples, when the cache memory space 104 has been partitioned, the digital compositor 108 can initiate digital compositing, which can include applying VFX to at least one video frame (e.g., inserting a CGI asset).

For example, the digital compositor 108 can issue a video frame request 118 for a video frame of the video frames 112. The compositing engine 100 includes a data manager 142 that includes a video frame retriever 120, which can process the video frame request 118 to provide a selected video frame 122. The video frame retriever 120 can provide the selected video frame 122 based on video frame latency data 124. The video frame latency data 124 can specify a number of video frames to be stored in the cache memory space 104 for digital compositing so that minimal or no visual problems (e.g., as described herein) are present in the augmented video data 110. Thus, the video frame latency data 124 can specify how fast composited video frames (that are part of the augmented video data 110) are rendered on a display. For example, if the video frame latency data 124 indicates a three (3) frame latency, the video frame retriever 120 can provide the third stored frame as the selected video frame 122 to the digital compositor 108.

The selected video frame 122 can also be provided to a scene related information frame retriever 126 of the data manager 142. The scene related information frame retriever 126 can extract a timecode from the selected video frame 122. Using the timecode, the scene related information frame retriever 126 can identify a scene related information frame of the scene related information frames 114. In some examples, the scene related information frame is identified by evaluating the extracted timecode to timestamps of the scene related information frames 114 and selecting the scene related information frame that is closest in time or distance to the timecode of the selected video frame 122. Other techniques for identifying the scene related information frame of the scene related information frames 114 can also be used, for example, as disclosed herein. The scene related frame retriever 126 can provide the scene related information frame as a selected scene related information frame 128, as shown in FIG. 1, which can be received by the digital compositor 108. The compositing engine 100 also includes a digital asset retriever 130, which can retrieve relevant digital asset data for the scene stored in the cache memory space 104 and provide this data to the digital compositor 108 as selected digital asset data 132. In some examples, the data manager 142 includes the digital asset retriever 130.

In some examples, the digital compositor 108 can receive a virtual environment of the scene to provide a 3D model 134 of the scene. The 3D model 134 can be used by the digital compositor 108 for generating the augmented video data 110. In some examples, the 3D model 134 can be generated by a model generator 144 based on environmental data 146. The environmental data 146 can be provided by one or more environmental sensors (not shown in FIG. 1). The one or more environmental sensors can include, for example, infrared systems, light detection and ranging (LIDAR) systems, thermal imaging systems, ultrasound systems, stereoscopic systems, RGB camera, optical systems or any device/sensor system currently known in the art, and combinations thereof, that are able to measure/capture depth and distance data of objects in an environment. Thus, the environment data 146 can characterize depth and distance data of objects in an environment (e.g., the scene).

In some examples, QR codes (or other image indicia) can be used establish a common origin in a coordinate system of the actual environment (e.g., the scene). A number of QR codes can be used to define an origin location the coordinate system for the actual environment. The QR codes can have different orientations to improve X, Y, Z information of the coordinate system. Information characterizing the coordinate system and the common origin can be provided as coordinate system data 148. For example, a device (e.g., a portable device, such as mobile phone, tablet, etc.) can be used to record each location/position/orientation of each QR code in the coordinate system of the actual environment and provide this data as the coordinate system data 148. The model generator 144 can receive the coordinate system data 148 and register virtual markers in the 3D model 134 as a starting location for digital assets to be inserted into the 3D model 134. Thus, the model generator 144 can insert the digital asset into the 3D model 134 at the virtual marker registered in the 3D model 134. In some examples, a graphical indication is provided in the 3D model 134 indicating where the digital asset is to be placed in the 3D model 134. Accordingly, the coordinate system data 148 can provide a translation (or registration) for digital assets into the actual environment.

The 3D model 134 can include a virtual camera representative of the video camera being used for filming the scene and a digital asset (e.g., a CGI asset) for insertion into the scene. The digital compositor 108 can output composited video frames that can be provided as the augmented video data 110 based on the 3D model 134 and selected video frames and scene related information frames, and, in some instances, the digital asset data provided from the cache memory space 104. Thus, a respective composited video frame can be provided based on the selected video frame 122, the selected scene related information frame 128, and in some instances based on the selected digital asset data 132.

In some examples, the 3D model 134 can be updated by the digital compositor 108 based on the selected scene related information frame 128. For example, the digital compositor 108 can update a pose of the virtual camera in the 3D model 134 based on nearest pose data captured or measured for the video camera (reflected as the selected scene related information frame 128). By way of further example, if a video camera's position changed in a real-world environment to a new camera position (from a prior camera position), the 3D model 134 can be updated to reflect the video cameras new position and the position of any CGI assets in the 3D model 134 can be updated to match the new video camera position based on the selected scene related information frame 128.

The digital compositor 108 can adjust for example, the position, orientation, and/or scale of the CGI asset in the 3D model 134 so that the CGI asset appears in a correct location in the 3D model 134 relative to a real-world footage (e.g., the real-world environment). The digital compositor 108 can use the updated 3D model for providing the augmented video data 110. For example, the digital compositor 108 can layer the CGI asset on top of the selected video frame so that the CGI asset appears in the scene at an updated position based on the updated 3D model 134 to provide the composited video frame.

Because the scene related information frames 114 are provided over the network (e.g., LAN, WAN, and/or the Internet), the scene related information frames 114 can experience network latency. To compensate for network latency effects on the scene related information frames 114, the compositing engine 100 can include a network analyzer 136. The network analyzer 136 can analyze the network (e.g., a network 253, as shown in FIG. 2, or a network 335, as shown in FIG. 3) over which the scene capture devices provide the scene related information frames 114 to determine a network latency of the network. In some examples, the data manager 142 includes the network analyzer 136. The network analyzer 136 can output network latency data 138 characterizing the network latency of the network, which can be received by the scene related frame retriever 126. The scene related frame retriever 126 can update a respective timestamp of the scene related information frames 114 based on the network latency of the network over which the scene related information frames 114 are provided based on the network latency data 138. Thus, in some examples, the scene related information frame being identified by the scene related frame retriever 126 can be based on an evaluation of adjusted timestamps (for network latency) of the scene related information frames 114 and the timecode of the video frame.

In additional or alternative examples, the respective timestamp of the scene related information frames 114 can be updated based on a frame delta value 140. The frame delta value 140 can be representative of an amount of time between each scene related information frame provided by a respective scene capture device of the scene capture devices. Because an internal clock of the respective scene capture device is internally consistent, the delta value between timestamps of neighboring scene related information frames from the same scene capture device can be about the same for a period of time. Using the frame delta value, the scene related frame retriever 126 can adjust the timestamp of scene related information frame of the scene related information frames 114 provided by the respective scene capture device to compensate for clock drift of the respective scene capture device.

By configuring the compositing engine 100 based on the video frame latency data 124, and in some instances, further based on the network latency data 138 and/or the frame delta value 140, the compositing engine 100 can provide an augmented shot of a scene at a given frame of latency (e.g., three (3) frame of latency) that is sufficient so that shots of the scene can be visualized during production with little to no visual problems. This is because the compositing engine 100 uses the data manager 142 to identify relevant scene related information frames and modify a timing of these frames according to a timestamp adjusting schema (as disclosed herein) to allow for accurate alignment of non-frame data from various and dissimilar scene sources (e.g., scene capture devices) with a video frame.

FIG. 2 is a block diagram of an example of a computing platform 200 that can be used for digital compositing. The computing platform 200 as described herein can composite video frames and digital assets to provide a composited stream of video frames for rendering on a display. The computing platform 200 can include a processor unit 202. The processor unit 202 can be implemented on a single integrated circuit (IC) (e.g., die), or using a number of ICs. The processor unit 202 can be a general-purpose processor, a special-purpose processor, an application specific processor, an embedded processor, or the like. The processor unit 202 can include an N number of processors, which can be collectively referred to as a CPU processing pool 206 in the example of FIG. 2. In some instances, each of the processors can include a number of cores.

The processor unit 202 can include cache memory that can be referred to collectively as a CPU memory space 208 in the example of FIG. 2. The cache memory can include, for example, L1, L2, and/or L3 cache. The CPU memory space 208 can be a logical representation of the cache memory of the processor unit 202, which can be partitioned according to the examples disclosed herein. In some examples, the CPU memory space 208 is distributed across multiple dies. For clarity and brevity purposes not all components (e.g., functional blocks, such as a memory controller, a system interface, an Input/Output (I/O) device controller, a control unit, an arithmetic logic unit (ALU), etc.) of the processor unit 202 are shown in the example of FIG. 2.

In some instances, the CPU memory space 208 includes a respective cache (or a subset of caches) for each of the processors (or the cores of the processors). In further examples, the CPU memory space 208 can include shared cache (e.g., L3 cache) that can be shared among processors and/or the cores. The CPU memory space 208 can be partitioned by the compositing engine 216 for real-time generation of augmented video data 212. In some examples, the augmented video data 212 corresponds to the augmented video data 110, as shown in FIG. 1. The augmented video data 212 can include one or more composited video frames that can be rendered on a display 214.

In some instances, real-time generation of the augmented video data 212 can correspond to generation of video frames at less than or equal to three (3) frames of latency. One or more processors of the processors of the CPU processing pool 206 can read and execute program instructions (or parts thereof) representative of a compositing engine 216. The compositing engine 216 can correspond to the compositing engine 100, as shown in FIG. 1. Thus, reference can be made to the example of FIG. 1 in the example of FIG. 2. The compositing engine 216 can be executed on the processor unit 202 to implement at least some of the functions, as disclosed herein. In some examples, the compositing engine 216 is representative of an application (e.g., a software application) that can be executed on the computing platform 200.

The computing platform 200 can include a graphics processing unit (GPU) 218 for providing the augmented video data 212. For example, the GPU 218 can include a GPU processing pool 220 that can provide composited data that can be converted to provide the augmented video data 212. For example, the GPU processing pool 220 can include a number of processing units. The GPU 218 can include a GPU memory space 222. For example, the GPU memory space 222 can include similar and/or different types of memory, for example, local memory, shared memory, global memory (e.g., DRAM), texture memory, and/or constant memory. Thus, the GPU memory space 222 can include cache memory, such as L2 cache. For clarity and brevity purposes not all components (e.g., interconnections, I/O interfaces, registers, ALU's, texture units, load/store units, other fixed function blocks, etc.) of the GPU 218 are shown in the example of FIG. 2. As the CPU memory space 208, the GPU memory space 222 can be a logical representation of the cache memory of the GPU 218 that can be partitioned according to the examples disclosed herein. In some examples, the CPU memory space 208 and/or the GPU memory space 222 can correspond to the cache memory space 104, as shown in FIG. 1.

For example, the computing platform 200 can include a number of interfaces, such as a video interface 224 and an I/O interface 226. The video interface 224 can be used to receive a video frame 228, which can be provided over a bus 230 to the GPU 218. In some examples, the video frame 228 is provided by a video capture device 232, as shown in FIG. 1. The video frame 228 can be representative of an image of a scene. The video frame 228 can also include metadata, such as a timecode (or timestamp), frame rates, resolution, and/or other information describing the video frame 228 itself.

In some examples, the video capture device 232 is implemented as a video capture card, and thus can be implemented as part of the computing platform 200. In other instances, the video capture device 232 is implemented as a stand-alone device that can communicate (e.g., using a wired and/or wireless medium) with the computing platform 200. The video capture device 232 can receive video data (e.g., a video data 336, as shown in FIG. 3) from a video camera (e.g., a video camera 306, or from another video source (e.g., storing recorded video data, for example in a cloud, on a disk, or another storage location). In some examples, the video camera is a digital video camera, such as a digital motion picture camera (e.g., Arri Alexa developed by Arri). In other examples, the video camera can correspond to a camera of a portable device (e.g., a mobile phone, a tablet, etc.). In some examples, the video frame 228 can correspond to one of the video frames 112, as shown in FIG. 1.

In some examples, the I/O interface 226 can be used to receive a scene related information frame 234 and digital asset data 236. The scene related information frame 234 can include, for example, face tracking data, body tracking data, asset pose data, and/or camera pose data. In some examples, the scene related information frame 234 can correspond to one of the scene related information frames 114, as shown in FIG. 1. The type of scene related information frame 234 can depend on a type of scene capture device used for the scene. For example, the I/O interface 226 can include a network interface, which can be used to communicate with external devices, systems, and/or servers to receive the scene related information frame 234 and the digital asset data 236. The scene related information frame 234 and/or the digital asset data 236 can be provided over a network 253, as shown in FIG. 1.

The network 253 can include one or more networks and/or the Internet. The one or more networks can include for example a local area network (LAN) or a wide area network (WAN). In additional or alternative examples, the 110 interface 226 can include a hard disk drive interface, a magnetic disk drive interface, and an optical drive interface, or an input device interface, which can be used to allow for the scene related information frame 234 and the digital asset data 236 to be loaded (e.g., stored) into a memory 238. The memory 238 can be representative of one or more memory devices, such as random access memory (RAM) devices, which can include static and/or dynamic RAM devices. The one or more memory devices can include, for example, a double data rate 2 (DDR2) device, a double data rate 3 (DDR3) device, a double data rate 4 (DDR4) device, a low power DDR3 (LPDDR3) device, a low power DDR4 (LPDDR4) device, a Wide I/O 2 (WIO2) device, a high bandwidth memory (HBM) dynamic random-access memory (DRAM) device, HBM 2 DRAM (HBM2 DRAM) device a double data rate 5 (DDR5) device, and a low power DDR5 (LPDDR5) device (e.g., mobile DDR). In some examples, the one or more memory devices can include DDR SDRAM type of devices.

The processor unit 202, the GPU 218, the video interface 224, the I/O interface 226, and the memory 238 can be coupled to the system bus 230. The system bus 230 can be representative of a communication/transmission medium over which data can be provided between the components, as shown in FIG. 2. In some instances, the system bus 230 includes any number of buses, for example, a backside bus, a frontside (system) bus, a peripheral component interconnect (PCI) or PCIe bus, etc. The system bus 230 can include corresponding circuit and/or devices to enable the components to communicate and exchange data for providing the augmented video data 212 based on the video frame 228, the scene related information frame 234, and the digital asset data 236.

In some examples, the processor unit 202 and/or the GPU 218 can convert the video frame 228 to a texture file depending on an implementation and design of the computing platform 200. For example, the video frame 228 can be decoded and decompressed (e.g., by the processor unit 202 or the GPU 218), and then converted into a texture file format that can be loaded and rendered by the GPU 218 with VFX according to the examples disclosed herein. In examples wherein the processor unit 202 has sufficient computational power, the processor unit 202 can implement video frame to texture file conversion, and the GPU 218 can use a texture file for the video frame 228 for image rendering. In some examples, the conversion of the video frame to a texture file is performed by both the processor unit 202 and the GPU 218, with each handling different operations of a conversion process. For example, the processor unit 202 can be responsible for decoding and decompressing the video frame 228, while the GPU 218 can be responsible for converting a decoded video frame into the texture file format and image rendering.

Overall, the specific implementation of the video frame to texture file conversion process can depend on system architecture, hardware capabilities, and software design of the computing platform 200. The compositing engine 216 can be used to control components of the computing platform 200 to implement digital compositing to provide a composited video frame based on the video frame 228, the scene related information frame 234 and the digital asset data 236. For example, the compositing engine 216 can be implemented as machine-readable instructions that can be executed by the CPU processing pool 206 to control a timing of when data is provided to and/or from the GPU 218, and/or loaded/retrieved from the CPU and/or the GPU memory spaces 208 and 222, and processed.

During CGI filming, it is desirable to know a location and/or behavior (movements) of a CGI asset and other elements relative to each other in the scene. That is, during production, a director or producer may want to know the position and/or location of the CGI asset so that other elements (e.g., actors, props, etc.), or the CGI asset itself, can be adjusted to create a seamless integration of the two. For example, the director may want the CGI asset to move and behave in a way that is consistent with live-action footage. Knowledge of where the CGI asset is to be located and how the CGI asset will behave is important for the director during filming (e.g., production) as it can minimize retakes, as well as reduce post-production time and costs. For example, knowledge of how the CGI asset is to behave in the scene can help the director adjust a position or behavior of an actor relative to the CGI asset. Generally, to help actors know where to look and how to interact with the CGI asset, filmmakers often use visual cues on set, such as reference objects, markers, targets, verbal cues, and in some instances, show the actor a pre-visualization of the scene. Pre-visualization (or "pre-viz"), is a technique, used in filmmaking to create a rough, animated version of a final sequence that gives the actor a rough idea of what the CGI asset will look like, where it will be positioned, and how it will behave before the scene filmed.

Alternative pre-visualization techniques have been developed that enable the director to view the asset in real-time on a display, during filming. For example, the director can use a previsualization system that has been configured to provide a composited video feed with an embedded CGI asset therein while the scene is being filmed. One example of such a device/system is described in U.S. patent application Ser. No. 17/410,479, and entitled "Previsualization Devices and Systems for the Film Industry," filed Aug. 24, 2021, which is incorporated herein by reference in its entirety. The previsualization system allows the director to have a "good enough" shot of the scene with the CGI asset so that production issues (e.g., where the actor should actually be looking, where the CGI asset should be located, how the CGI asset should behave, etc.) can be corrected during filming and thus at a production stage. The previsualization system can implement digital compositing to provide composited video frames with the CGI asset embedded therein.

During digital compositing, movements of the CGI asset are synchronized with video footage in a film or video so that when the composited video frames are played back on a display the movements of the CGI asset are coordinated with movements of the live-action footage. Previsualization systems can be configured to provide for CGI asset-live-action footage synchronization. For example, the previsualization system can implement composition techniques/operations to combine different elements, such as live-action footage, the CGI asset, CGI asset movements, other special effects, into augmented video data (one or more composited video frames). The augmented video data can be rendered on the display and visualized by a user (e.g., the director).

In some instances, data for generating the augmented video data may arrive at different times at a compositing device (also known as a compositor) of the previsualization system, for example, during filming. The data can arrive at different times over a network (such as the network 253, as shown in FIG. 2) at the compositing device. Additionally, the data can be generated by different scene capture devices based on an internal or local clock, which can drift over time. Additionally, in some instances, the scene capture devices may not be not time-synced (or jammed) (e.g., connected to a central timecode generator) with the video camera. In some scenarios, one or more scene capture devices may not support jamming. Thus, as video frame and other scene data arrives at the compositor, the compositor may not use the most relevant scene related information data (frame) for digital compositing, which can introduce visual problems into the composited video data. Because the compositor may receive the data at different times, in some instances, movements of the CGI asset are not properly synchronized with the video footage, which can result in a number of visual problems that can make the CGI asset look unconvincing, or unrealistic during filming.

According to the examples disclosed herein, the compositing engine 216 can be configured to mitigate or eliminate (in some instances) visual problems in the augmented video data 212. The compositing engine 216 can control which scene related information frame 234 is used for compositing to provide the augmented video data 212 having reduced or no visual problems. Thus, in some examples, the compositing engine can employ the data manager 142, as shown in FIG. 1.

For example, during filming (production), for digital compositing, the video camera can provide the video frame 228 to the computing platform 200, which the video interface 224 can communicate over the bus 230 to the GPU 218. In some examples, the video frame 228 is loaded into the CPU memory space 208 and/or the GPU memory space 222 for VFX processing (e.g., CGI insertion, etc.). In an example, the CPU memory space 208 can include even and odd video frame cache locations 238-240, a scene cache location 242, and a digital asset cache location 244.

The processor unit 202 or the GPU 218 can load the video frame 228 into one of the even or odd video frame cache locations 238-240 based on the timecode of the video frame 228. For example, if the timecode for the video frame in the video frame 228 appears as 01:23:45:12, the processor unit 202 or the GPU 218 can load the video frame 228 into the even video frame cache location 238 because "12" is an even number. A timecode for a video frame is a numerical representation of a specific time at which a frame appears in a video, and includes hours, minutes, seconds, and frames. The video frame 228 loaded into the even video frame cache location can be referred to as even video frame and thus a video frame loaded into the odd video frame cache location can be referred to as an odd video frame.

In some examples, the GPU 218 (or in combination with the processor unit 202) can convert the video frame 228 to a texture file format, which can be referred to as texture frame data. The texture frame data can be stored in the GPU memory space 222. For example, the compositing engine 216 can cause the GPU processing pool 220 (or in combination with the CPU processing pool 206) to convert the video frame 228 to provide the texture frame data. The compositing engine 216 can cause threads to be assigned to processing elements of the GPU 218 and/or the processor unit 202 for conversion of the video frame 228. Once converted, the texture frame data can be stored in the even video frame cache location 238 (based on the timecode for the video frame 228), and can be referred to as even texture frame data.

A subsequent received video frame can be processed in a same or similar manner as disclosed herein and stored in the odd video frame cache location 240 rather than the even video frame cache location 238. In some examples, once the subsequent video frame is converted to a texture frame data, the texture frame data can be stored in the odd video frame cache location 240 (based on the timecode for the subsequent video frame), and can be referred to as odd texture frame data. For example, if the timecode for the subsequent video frame is "13" the processor unit 202 or the GPU 218 can load the subsequent video frame (or the odd texture frame data) into the odd video frame cache location 240 because "13" is an odd number.

In some instances, the compositing engine 216 can receive video frame latency data 217. The video frame latency data 217 can specify a number of video frames to be stored in the CPU or GPU memory space 208 or 222 for digital compositing (prior to digital compositing) so that minimal or no visual problems are present in the augmented video data 212. Thus, the video frame latency data 217 can specify how fast composited video frames are rendered on the display 219. Accordingly, the number of frames specified by the video frame latency data 217 can be such that little to no visual problems are present in the augmented video data 212. By way of non-limiting example, the video frame latency data 217 indicates three (3) video frames. The compositing engine 216 can select or identify a video frame (or texture frame data) for digital compositing based on the video frame latency data 217. For example, if the video frame latency data 217 indicates three video frames, the compositing engine 216 can select the third video frame (stored in a memory space) for digital compositing.

A time or amount of time that it takes to generate the texture frame data can change from video frame to video frame due to processing or loading requirements of the computing platform 200. An amount of processing required can change based on frame complexity (e.g., with more complex visual content). Thus, video frame conversion time (the amount of time to generate the texture frame data) can vary or change from video frame to video frame. Additionally, the odd and even video frames (or odd and even texture frame data) can be loaded into corresponding cache memory space locations (for further processing) before the scene related information frame 234 arrives at the computing platform 200. In some examples, by the time the third video frame arrives and is stored (in some instances converted to a corresponding texture file and then stored), the scene related information frame 234 (generated at about the time that the video frame 228 was generated) has arrived at the computing platform 200. Because the compositing engine 216 selects, for example, the third video frame for digital compositing, this provides sufficient time for the arrival of the scene related information frame 234 at the computing platform 200.

In some examples, the compositing engine 216 can partition the GPU memory space 222. For example, if the GPU 218 has sufficient computational power, the GPU memory space 222 can be partitioned in a same or similar manner as the CPU memory space 208. Thus, in some examples, the GPU memory space 222 can include even and odd video frame cache locations 246-248, a scene cache location 250, and a digital asset cache location 252. Video frames (or corresponding texture frame data) can be stored in the even and odd video frame cache locations 246-248 in a same or similar manner as disclosed herein. Thus, in some implementations, the even/odd video frame writes (or corresponding texture files, if converted by the GPU processing pool 220) can be eliminated and video frame (or texture file) data can be stored in the GPU memory space 222 instead. In examples wherein corresponding video frame needs to be saved on an external device, the GPU 218 can store the corresponding video frame at the CPU memory space 208 so that the corresponding video frame can be provided to the external device.

Once the scene related information frame 234 is received, the compositing engine 216 can cause the scene related information frame 234 to be stored in the memory 239 (for later retrieval), the scene cache location 242, or the scene cache location 250. Continuing with the example of FIG. 1, the compositing engine 216 can cause the processor unit 202 or the GPU 218 to select the third video frame (or third texture frame data) from the CPU memory space 208 or the GPU memory space 222 in response to receiving the scene related information frame 234. The compositing engine 216 can cause the scene related information frame 234 to be loaded into one of the scene cache location 242 or the scene cache location 250. The compositing engine 216 can also cause the digital asset data 236 to be loaded into one of the digital asset cache location 244 or the digital asset cache location 252 for digital compositing.

In some examples, the compositing engine 216 can cause the processor unit 202 or the GPU 218 to generate a virtual environment (a 3D model) 254 that can be representative of the scene, and thus a real-world environment. The compositing engine 216 (or another system) can insert a CGI asset into the virtual environment 254 based on the digital asset data 236. In other examples, a different system can be used to create the virtual environment, which can be provided to the computing platform 200. The process of creating the 3D model 254 can include for example creating objects and elements in the scene, such as buildings, props, characters, special effects, etc. The 3D model 254 can include a virtual camera that can correspond to the video camera being used to capture the scene. The virtual camera can be adjusted based on camera pose data. Because the location of the CGI asset is known in the 3D model 254 and the virtual environment is representative of the scene, the CGI asset can be inserted into the scene during digital compositing based on the digital asset data 236. In some examples, the 3D model 254 corresponds to the 3D model 134, as shown in FIG. 1.

In some examples, a scene capture device providing the scene related information frame 234 can record or measure relevant data at a different frame rate than the video camera provides video frames. For example, the scene capture device can provide scene related information frames at higher frame rate (e.g., at about 60 FPS) than the digital camera (e.g., at about 30 FPS). Because the scene capture device provides the scene related information frame 234 at a different frequency than the video camera provides the video frame 228, use of incorrect scene related information can introduce visual problems into the augmented video data 212. According to the examples disclosed herein, the compositing engine 216 can identify the most appropriate or correct scene related information frame for digital compositing (e.g., by the digital compositor 108, as shown in FIG. 1). The scene related information frame 234 provided at each instance by a corresponding scene capture device can include a timestamp, which can indicate an instance in time (based on a local clock of the scene capture device) that the scene related information frame 234 was generated.

For example, the compositing engine 216 can cause the processor unit 202 or the GPU 218 to update the 3D model 254 based on the scene related information frame 234. The compositing engine 216 causes the processor unit 202 or the GPU 218 to evaluate the scene related information frame 234 provided at different time instances by the corresponding scene capture device to identify the scene related information frame 234 with a timestamp that is closest to the timecode of a selected video frame (e.g., the third video frame). In some examples, the compositing engine 216 can cause the processor unit 202 or the GPU 218 to convert the timecode for the selected video frame to a timestamp. For example, the compositing engine 216 can cause the processor unit 202 or the GPU 218 to convert the time code based on a frame rate of the video camera, and a frame number of the selected video frame. As an example, if a timecode for the 14th frame of a video that is being provided at a frame rate of 30 FPS (by the video camera), the calculation would be: timestamp=$(14-1)/30$=0.367 seconds. Using the calculated timestamp for the selected video frame, the compositing engine 216 can cause the processor unit 202 or the GPU 218 to identify the scene related information frame 234 with the timestamp that is closest to the timestamp of the selected video frame, which can be referred to as a nearest scene related information frame.

The compositing engine 216 can cause the processor unit 202 or the GPU 218 to update the 3D model 254 based on the nearest scene related information frame. For example, the compositing engine 216 can cause the processor unit 202 or the GPU 218 to update a pose of the virtual camera in the 3D model 254 based on nearest pose data captured or measured for the video camera. As each instance of the scene related information frame 234 arrives at the computing platform 200, the scene related information frame 234 can be stored in the memory 238, or in a corresponding cache memory space (e.g., one of the CPU or GPU memory spaces 208 and 222).

The compositing engine 216 can cause the processor unit 202 or the GPU 218 to identify the nearest scene related information frame for generating of the composited video frame. By way of example, if the video camera's position changed in the real-world environment to a new camera position (from a prior camera position), the 3D model 254 can be updated to reflect the video cameras new position and the position of any CGI assets in the 3D model 254 can be updated to match the new video camera position based on the nearest scene related information frame. The compositing engine 216 can cause the processor unit 202 or the GPU 218 to adjust for example, the position, orientation, and/or scale of the CGI asset in the 3D model 254 so that the CGI asset appears in a correct location in the 3D model 254 relative to a real-world footage (e.g., the real-world environment).

For example, if the timestamp for the selected video frame (or selected texture frame data) is closer (e.g., in distance, time, percentage, etc.) to a first timestamp value of a first scene related information frame than a second timestamp value of a second scene information related frame, the compositing engine 216 can use the scene related information frame 234 (e.g., one of the first or second scene related information frame) with the given timestamp value as the nearest scene related information frame. In some examples, the compositing engine 216 can cause the processor unit 202 or the GPU 218 to use interpolated scene related data for updating the 3D model 254. For example, if the timestamp for the selected video frame is a given distance, time value, or percentage, from the first and second timestamp values, the compositing engine 216 can cause the processor unit 202 or the GPU 218 to interpolate the scene related data based on the first and second scene related datasets. The interpolated scene related data can be used as the nearest scene related information frame for updating the 3D model 254.

The processor unit 202 or the GPU 218 can use the updated 3D model for digital compositing. In some examples, the 3D model is updated as part of digital compositing. For example, the processor unit 202 or the GPU 218 can layer the CGI asset on top of the selected video frame so that the CGI asset appears in the scene at an updated position based on the updated 3D model 254. In some examples, the compositing engine 216 can cause the processor unit 202 or the GPU 218 to convert the texture file data for the selected video frame back to video frame format for blending (e.g., layering) of the CGI on the selected video frame. Regardless of which technique or approach is used for digital compositing, the processor unit 202 or the GPU 218 can provide the composited video frame for the selected video frame for rendering on the display 219. When inserting a CGI asset into a video frame, the compositing engine 216 can use various techniques to ensure that the CGI asset matches the lighting, shadows, reflections, and other visual properties of the live-action footage. This can involve adjusting the color grading, applying depth of field or motion blur effects, and adjusting the transparency or blending modes of the CGI asset to ensure that it looks like a natural part of the scene.

Because the scene related information frame 234 is provided over the network 253 (e.g., LAN, WAN, and/or the Internet), the scene related information frame 234 can experience network latency. The network latency can add additional timing delay to the scene related information frame 234, such that the compositing engine 216 may select an incorrect scene related information frame. To compensate for network latency effects on the scene related information frame 234, the compositing engine 216 can communicate using a network interface (corresponding to one of the I/O interfaces 226) to ping each scene capture device that provided the scene related information frame 234. The compositing engine 216 can determine an amount of time it takes for ping data to travel from the computing platform 200 to a scene capture device and back. The amount of time can correspond to the network latency. The compositing engine 216 can adjust the time stamp for the scene related information frame 234 (from a given scene capture device) once it arrives over the network 253 at the computing platform 200 based on the determined network latency. The adjusted timestamps can then be evaluated in a same or similar manner as disclosed herein for identifying the nearest scene related information frame for the selected video frame (or selected texture frame data) for digital compositing.

In some examples, a scene capture device can be time synced with the video camera. For example, the scene capture device and the video camera can be configured with a timecode generator. Each timecode generator can generate a unique timecode signal that can be synchronized with a master timecode source. The master timecode source can be a standalone device, such as a timecode generator. Once the timecode generators are synchronized, the scene capture device can provide the scene related information frame 234 with a timestamp (or timecode) that is synchronized to the master timecode source. Similarly, the video camera can provide the video frame 228 with a timecode that is synchronized to the master timecode source. However, because a clock of the scene capture device is synced to a clock of its timecode generator, and clocks are known to drift overtime, the timestamp (or timecode) of each instance of the scene related information frame 234 provided by the scene capture device will be different from an expected time (if there was no drift).

Additionally, network latency can influence the timestamp (or timecode) of the scene related information frame 234 as this data travels over the network 253 to the computing platform 200 from the scene capture device. Because the compositing engine 216 is configured based on the video frame latency data 217, the compositing engine 216 can identify or select a video frame (or texture frame data) wherein sufficient time has been provided for the scene related information frame 234 to arrive at the computing platform 200 from the scene capture device. According to the examples disclosed herein, the compositing engine 216 can identify the nearest scene related information frame for the selected video frame (or selected texture frame data) in a same or similar manner as disclosed herein for digital compositing.

In some examples, the compositing engine 216 causes the processor unit 202 or the GPU 218 to adjust the timestamp of the scene related information frame 234 based on a frame delta value. The frame delta value can be representative of an amount of time between each scene related information frame provided by the scene capture device. Because an internal clock of the scene capture device is internally consistent, the delta value between timestamps of neighboring scene related information frames can be about the same for a period of time. Using the frame delta value, the compositing engine 216 can cause the processor unit 202 or the GPU 218 to adjust the timestamp of the scene related information frame 234 to compensate for drift of the scene capture device. If the compositing engine 216 determines that visual problems are increasing in the augmented video data 212, the compositing engine 216 can adjust the video frame latency automatically to reduce these visual effects, or in some instances, a user can provide updated video frame latency data identifying a new video frame latency for the computing platform 200. Thus, in some instances, the user can cause the computing platform 200 to vary an amount of visual problems that are in the augmented video data 212 based on the video frame latency data 217. For example, the compositing engine 216 can provide a graphical user interface (GUI) or cause another module or device to provide the GUI with GUI elements for setting the video frame latency for the computing platform 200. The video frame latency set by the user based on the GUI can be provided as the video frame latency data 217. Accordingly, by controlling which video frame (or associated texture file) is used for digital compositing based on the video frame latency data 217 provides sufficient time so that the scene related information frame 234 can arrive from different scene capture devices being used in film production. A three (3) frame latency has been determined to provide sufficient time for different types of scene related information frames to arrive over the network 253 at the computing platform 200, in some instances. In addition, a three (3) frame latency has been determined to provide a sufficiently near-real time composited video to be useful in production to direct live action footage that will support CGI asset-live-action footage synchronization.

In some examples, the computing platform 200 is located on-site, that is, on the film set. In other examples, the computing platform 200 is located in a cloud environment. When the computing platform 200 is located in the cloud environment, the augmented video data 212 can be transmitted over a network to the display 219 that is located on the film set. In the present examples, although the components of the computing platform 200 are illustrated as being implemented on the same system, in other examples, the different components could be distributed across different systems (in some instances in the cloud computing environment) and communicate, for example, over a network.

In some examples, the display 219 is a camera viewfinder and thus the augmented video data 212 can be rendered to a camera operator, which in some instances can be the director. In some instances, the display 219 is one or more displays and includes the camera viewfinder and a display of a device, for example, a mobile device, such as a tablet, mobile phone, etc. In some instances, the one or more displays includes a display that is located in a video village, which is an area on a film set where film crew members can observe augmented and/or (raw) video footage as it is being filmed. The film crew members can watch the video footage, augmented and/or raw, and correct any potential identified film production problems (e.g., the actor is looking in the wrong direction).

Because during filming more than one video camera is used, in some examples, the compositing engine 216 can provide corresponding augmented video data (at a perspective of each digital video camera) in a same or similar manner as disclosed herein. In some instances, each video camera has its own computing platform similar to the computing platform 200, as shown in FIG. 2, for providing the corresponding augmented video data. In some examples, each video camera is jam-synced. For example, if the scene is being filmed by video cameras (more than one), the video cameras can be time synced electronically so that all of the digital video cameras provide video frames at a given instance of time with a same or similar timecode. For example, all of the video cameras can provide a given video frame at about the same time and thus with the same or similar timecode. In some examples, the timecode is a Society of Motion Picture and Television Engineers (SMPTE) timecode.

In some examples, the computing platform 200 can be dynamically adjusted based on the video frame latency data 217 so as new scene capture devices are used (e.g., on set, during filming, etc.), new scene related information frames can be synced with video frames to provide augmented video data 212 that has little to no visual problems. As such, as a frame rate (the rate at which the scene capture devices provided data) changes (e.g., higher or lower), the computing platform 200 can be configured to adapt to a new frame rate based on the video frame latency data 217 that is provided by the user.

In some examples, once the video frame 228 has been used by the computing platform 200, the compositing engine 216 can cause the processor unit 202 or the GPU 218 to remove the video frame 228 from a corresponding cache memory space. Thus, the compositing engine 216 can expire video frames and related data (e.g., metadata) no longer needed to free up locations in the corresponding cache memory space for new data/information, which can be processed according to the examples disclosed herein.

In some examples, the computing platform 200 may not receive the video frame 228, for example, if the digital video camera is offline, or the video frame 228 is unable to be provided to the computing platform 200. In these examples, the computing platform 200 can create artificial video frames with a timecode that can be processed and thus time-aligned with the scene related information frame 234 in a same or similar manner as disclosed herein. For example, if the director would like to adjust the CGI asset but does not require the scene, the computing platform 200 can be used to provide the CGI asset in the augmented video data 212 (in-shot) so that the director can make appropriate changes using the computing platform 200.

Accordingly, the computing platform 200 can provide an augmented shot of a scene at a given frame of latency (e.g., three (3) frame of latency) that is sufficient so that shots of a scene can be visualized during film production with little to no visual problems. The compositing engine 216 uses a data management and timecoding schema that enables for accurate alignment of non-frame data from various and dissimilar data sources (e.g., scene capture devices) with a video frame FIG. 3 is a block diagram of an example of a system 300 for visualizing CGI video scenes. The system 300 can be used to provide real time augmented video data on a display 302, such as during filming. The augmented video data can correspond to the augmented video data 110, as shown in FIG. 1, or the augmented video data 212, as shown in FIG. 2. Thus, reference can be made to the example of FIGS. 1-2 in the example of FIG. 3. In the example of FIG. 3, the display 302 illustrates a composited video frame of the augmented video data (at an instance in time) that includes an image of a scene 304 captured by a video camera 306 with a digital asset 308 (e.g., a CGI asset). A computing platform 310 can be used to provide the augmented video data with one or more images in which digital assets have been incorporated therein. The composited video frame on the display 302 is exemplary and in other examples can include any number of digital assets or no digital assets at all (e.g., when the digital asset moves outside the scene or a field of view of the video camera 306). The computing platform 310 can correspond to the computing platform 200, as shown in FIG. 2.

For example, the computing platform 310 can receive scene related data 312, which can include one or more scene related information frames, such as disclosed herein with respect to FIGS. 1-2. For example, the scene related data can include rig tracking data 314, which can be provided by a rig tracking system (or device) 316. The rig tracking system 316 can be used to track a rotation and position of a rig on which the video camera 306 is mounted. Example rigs can include a tripod, a handheld rig, a shoulder rig, an overhead rig, a POV rig, a camera dolly, a slider, rig, film crane, camera stabilizer, snorricam, etc. The rig tracking data 314 can characterize the rotation and position of the rig. The rig tracking data can also include a timestamp indicative of an instance in time at which the rotation and position of the rig was captured.

In some examples, the scene related data 312 can include body data 318, which can be provided by a body tracking system (or device) 320. The body tracking system 320 can be used to track a location of a person in the scene 304 in a body tracking coordinate system. The body data 318 can specify location information for the person in the body tracking coordinate system. In some examples, the body data

318 can specify rotational and/or joint information for each joint of the person. The body data 318 can also specify a position and orientation of the person in the body tracking coordinate system. The body tracking system 320 can provide the body data 318 with a timestamp indicating a time that body movements therein were captured. Example body tracking systems can include a motion capture suit, a video camera system (e.g., one or more cameras, such as from a mobile phone, used to capture body movements), etc. In examples wherein the body tracking system 320 is implemented as a video camera system, body movements captured by the video camera system can be extracted from images and provided as, or as part of the body data 318. Furthermore, in examples wherein the body tracking system 320 is implemented as a motion capture suit, the motion capture suit can be time synced with the video camera 306 or a number of video cameras 306 capturing the scene 304, and the body data 318 can include a timecode indicating a time that body movements were captured. In some examples, the facial data 322 can be used for animating the digital asset 308, for example, body movements of the digital asset 308.

In some examples, the scene related data 312 includes facial data 322, which can be provided by a facial tracking system 324. The facial data 322 can characterize movements of a person's face. The facial tracking system 324 can be implemented as a facial motion capture system. In some instances, the facial tracking system 324 includes a mobile device (e.g., a mobile phone) with software for processing images captured by a camera of the mobile device to determine facial characteristics and/or movements of the person. The facial tracking system 324 can provide the facial data 322 with a timestamp indicating a time that movements of the person's face were captured. The facial data 322 can be used for animating the digital asset 308, for example, facial expressions of the digital asset 308

In some examples, the scene related data 312 includes prop data 326, which can be provided by a prop tracking system (or device) 328. The prop tracking system 328 can be used to track one or more props in the scene 304. The prop tracking system 328 can provide the prop data 326 with a timestamp indicating a time that prop movements were captured. A prop can be any asset you want to track in space. This might include a starting pose for a character to be animated such as a CGI asset, a sword and shield to be held in someone's hand as they move, or an asset like a piece of furniture to be stored positioned in the scene.

In some examples, the computing platform 310 can receive digital asset data 330, which can correspond to the digital asset data 236, as shown in FIG. 2. For example, the digital asset data 330 can include CGI asset data and related information for animating one or more CGI assets (e.g., the digital asset 308) in a scene, such as the scene 304. In some examples, the digital asset data 330 includes controller data 332 provided by an asset controller 334. In one example, the asset controller 334 is an input device, for example, a controller. The asset controller 334 can be used to control movements and facial expression of the digital asset 308 in the scene 304. For example, the asset controller 334 can output controller data 332 characterizing the facial and/or body movements that the digital asset 308 is to implement. The controller data 332 can include a timecode indicating a time that the facial and/or body movements were captured. The controller data 332 can be used for animating the digital asset 308 (e.g., by the computing platform 310). In some examples, the controller data 332 can indicate a start and end time for a CGI action (e.g., movement and/or rotation). In some examples, a number of asset controllers can be used. For example, a first asset controller can be used to manipulate a torso of the digital asset 308, another asset controller for arms of the digital asset 308, and a further asset controller for manipulating finger movement of the digital asset 308, another asset controller device for manipulating lips of the digital asset 308, and so on. The controller data 332 from each of the asset controllers can be provided to the computing platform 310 for processing according to the examples disclosed herein. Accordingly, a number of different asset controllers can be used to control different portions of the digital asset 308, allowing for layering of different motions/movements of a digital asset into a single character.

In the example of FIG. 3, the video camera 306 provides video data 336 with one or more video frames with images of the scene 304. Each video frame can include a timecode. If a number of digital video cameras are used to capture the scene 304, the digital video cameras can be time synced as described herein. In some examples, a timecode can be generated from the computing platform 310 clock in cases where no timecode is present. This still allows for synchronization though can be less accurate than when using dedicated timecode devices. In some examples, the one or more video frames of the video data 336 can include the video frames 112, as shown in FIG. 1, and/or the video frame 228, as shown in FIG. 2.

The computing platform 310 can be implemented in a same or similar manner as the computing platform 200 to process the video data 336, the scene related data 312 and/or digital asset data 330 to provide the augmented video data, which is rendered in the example of FIG. 3 on the display 302. In some examples, the scene related data 312 includes the scene related information frames 114, as shown in FIG. 1, and/or the scene related information frame 234, as shown in FIG. 2. The computing platform 310 can provide an augmented shot of a scene at a given frame of latency (e.g., three (3) frames of latency) that is sufficient so that shots of a scene can be visualized during film production with little to no visual problems. By configuring the computing platform 310 with the data manager 142, as shown in FIG. 1, enables the computing platform 310 to accurately align non-frame data from various and dissimilar sources, such as the rig tracking system 316, the body tracking system 320, the facial tracking system 324, and the asset controller 334, with a video frame.

In some examples, the rig data 314, the body data 318, the facial data 322, the prop data 326, the controller data 332 and the video data 336 are provided over a network 335, such as the network 253, as shown in FIG. 1. In other examples some or all of the data 314, 318, 322, 326, 332, and 336 are provided over the network 335. In some examples, the camera 306 can be connected using a physical cable to the computing platform 310, which can be considered outside or not part of the network 335. In some examples, the video camera 306 and the systems 316, 320, 324, 328, and the asset controller 334 can be connected to the computing platform 310 using the network 335, which can include wired and/or wireless connections. For example, high bandwidth cables can be used to connect an HDMI output or SDI output of the video camera 306 to the computing platform 310 so as to transmit high resolution-video data at high rate to the computing platform 310. Example HDMI cables include, but are not limited to, HDMI 2.1 cable having a bandwidth of 48 Gbps to carry resolutions up to 10K with frame rates up to 120 fps (8K60 and 4K120). Example SDI cables include, but are not limited to, DIN 1.0/2.3 to BNC Female Adapter Cable. An external or internal hardware capture card (such as the internal PCI Express Blackmagic Design DeckLink SDI Capture Card or the external unit Matrox MAXO2 Mini Max for Laptops which supports a variety of video inputs such as HDMI HD 10-bit, Component HD/SD 10-bit, Y/C (S-Video) 10-bit or Composite 10-bit) can be employed to provide the video data 336 to an interface (e.g., one of the I/O interfaces 226, as shown in FIG. 2) of the computing platform 310.

In some examples, the system 300 can include a server 337, which can be coupled to the network 335, and the rig data 314, the body data 318, the facial data 322, the prop data 326, the controller data 332 and the video data 336 can be routed through the server 337. For example, the server 337 can communicate with each system 316, 328, 320, 324 and/or the asset controller 334 and route data as messages to the computing platform 310. Thus, in some examples, the server can use a publisher/subscriber paradigm in which each system 316, 328, 320, 324 and/or the asset controller 334 are publishers and the computing platform is a subscriber. By way of further example, the server 337 can be implemented on a device, such as a laptop.

In some examples, the computing platform 310 can be used for post-production. For example, pre-recorded video data 338 with video frames can be processed in a same or similar manner as the video data 336 with other scene related information (data/frames) to provide augmented video data. For example, the computing platform 310 can be used to re-animate a live-take and insert a new digital asset (not used during production) into video footage (represented by the pre-recorded video data 338). In some example, the computing platform 310 can be used to modify actions and/or a behavior of an inserted digital (e.g., such as the digital asset 308) initially used during production.

For example, the computing platform 310 can include a virtual environment builder 340 that can recreate or regenerate a 3D model 342 representative of a scene captured by one or more video cameras from which the pre-recorded video data 338 is provided based on environmental data 344 captured for the scene. The environmental data 146 can be provided by one or more environmental sensors, such as disclosed herein. An input device 346 can be used to provide commands/actions to a model updater 348 for adjusting one or more virtual features of the 3D model 342. The one or more virtual features can include a position/orientation of each virtual camera representative of a video camera from which the pre-recorded video data 338 is provided, position/orientation of a digital asset in the 3D model 342, and other types of virtual features. The computing platform 310 can include a digital compositor 350, which can be implemented in some instances similar to the digital compositor 108, as shown in FIG. 1. The digital compositor 350 can provide augmented video data based on the 3D model 342, and the pre-recorded video data 338. Accordingly, in some examples, the computing platform 310 can be used in post-production allowing for a reshoot of a scene by adjusting the 3D model 342 so that VFX (if available in the video data 338) can be modified or adjusted, or in some instances, insert into the video data 338 to provide the augmented video data.

Figure 4:
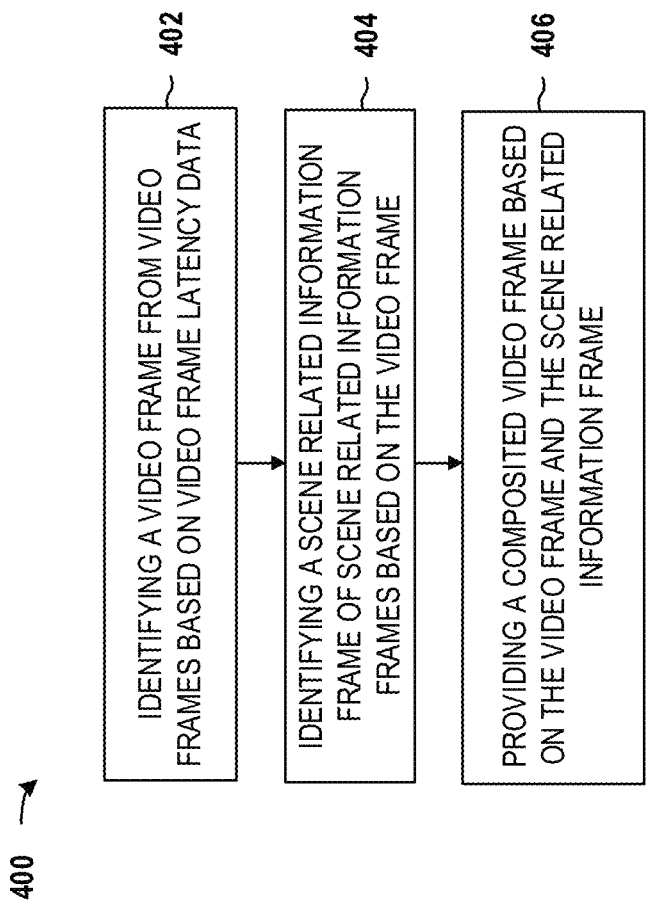
FIG. 4 is an example of a method for providing a composited video frame during production.
Figure 5:
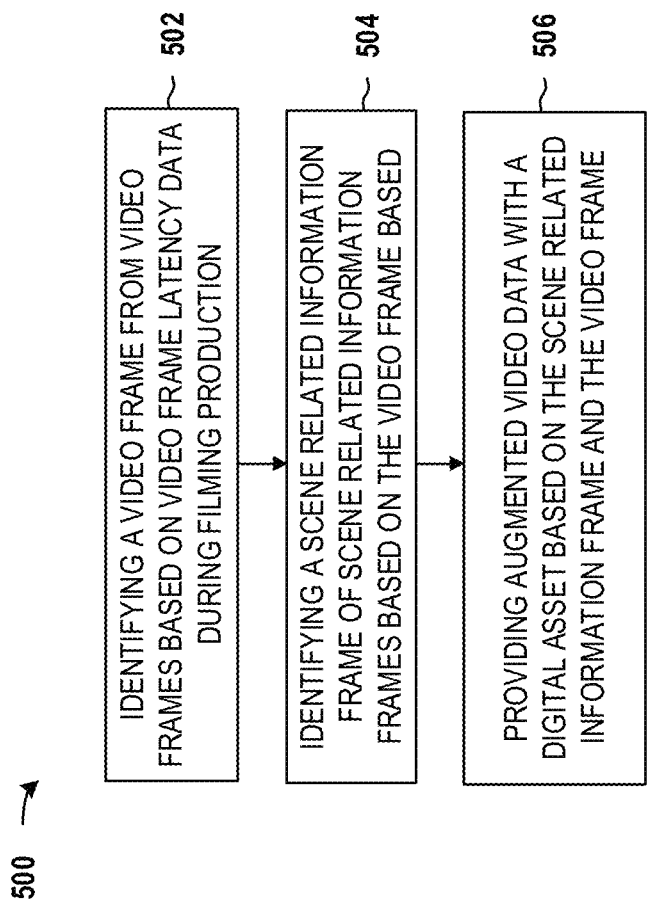
FIG. 5 is an example of a method for providing augmented video data during production.

In view of the foregoing structural and functional features described above, an example method will be better appreciated with reference to FIGS. 4-5. While, for purposes of simplicity of explanation, the example methods of FIGS. 4-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 4 is an example of a method 400 for providing a composited video frame. The method 400 can be implemented by the compositing engine 100, as shown in FIG. 1, or the compositing engine 216, as shown in FIG. 2. Thus, reference can be made to the example of FIGS. 1-3 in the example of FIG. 4. The method 400 can begin at 402 with a video frame (e.g., one of the video frames 112, as shown in FIG. 1) from video frames stored in a cache memory space (e.g., the cache memory space 104, as shown in FIG. 1) being identified (e.g., by the video frame retriever 120, as shown in FIG. 1) based on video frame latency data (e.g., the video frame latency data 124, as shown in FIG. 1). The video frame latency data can specify a number of video frames to be stored in the cache memory space before the video frame is selected. At 404, a scene related information frame (e.g., one of the scene related information frames 114, as shown in FIG. 1) of the scene related information frames can be identified (e.g., by the scene related frame retriever 126, as shown in FIG. 1) based on a timecode of the video frame. At 406, a composited video frame (e.g., that is part of the augmented video data 110, as shown in FIG. 1) can be provided based on the video frame and the scene related information frame.

FIG. 5 is an example of a method 500 for providing augmented video data during a previsualization of a scene . The method 500 can be implemented by the compositing engine 100, as shown in FIG. 1, or the compositing engine 216, as shown in FIG. 2. Thus, reference can be made to the example of FIGS. 1-4 in the example of FIG. 5. The method 400 can begin at 502 by identifying a video frame (e.g., one of the video frames 112, as shown in FIG. 1) from video frames provided by a video camera (e.g., the camera 306, as shown in FIG. 1) representative of a scene (e.g., the scene 304, as shown in FIG. 1) during filming production based on video frame latency data (e.g., the video frame latency data 124, as shown in FIG. 1). The video frame latency data can specify a number of video frames to be stored in memory of a computing platform before the video frame is selected. At 504, a scene related information frame (e.g., one of the scene related information frames 114, as shown in FIG. 1) of scene related information frames provided by scene capture devices (e.g., of one of the systems 316, 320, 324, and/or 328, and/or the asset controller 334, as shown in FIG. 1) can be identified (e.g., by the scene related frame retriever 126, as shown FIG. 1) based on an evaluation of a timecode of the video frame relative to a timestamp of the scene related information frames. The timestamp for the scene related information frames can be generated based on a frame delta value representative of an amount of time between each scene related information frame provided by a respective scene capture device of the scene capture devices. At 506, augmented video data (e.g., the augmented video data 110, as shown in FIG. 1) with a digital asset (e.g., the digital asset 308, as shown in FIG. 1) based on the scene related information frame and the video frame can be provided (e.g., for rendering on an output device, such as the display 219, as shown in FIG. 2, or the display 302, as shown in FIG. 3).

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 6. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In this regard, FIG. 6 illustrates one example of a computing system 600 that can be employed to execute one or more embodiments of the present disclosure. Computing system 600 can be implemented on one or more general purpose networked computer systems, embedded computer systems, routers, switches, server devices, client devices, various intermediate devices/nodes or standalone computer systems. Additionally, computing system 600 can be implemented on various mobile clients such as, for example, a personal digital assistant (PDA), laptop computer, pager, and the like, provided it includes sufficient processing capabilities. In other examples, the computing system 600 can be implemented on dedicated hardware.

Computing system 600 includes processing unit 602, memory 604, and system bus 606 that couples various system components, including the memory 604, to processing unit 602. Dual microprocessors and other multi-processor architectures also can be used as processing unit 602. In some examples, the processor 602 corresponds to the processor unit 202, as shown in FIG. 2. System bus 606 may be any of several types of bus structure including a memory bus or memory controller, a peripheral bus, and a local bus using any of a variety of bus architectures. Memory 604 includes read only memory (ROM) 610 and random access memory (RAM) 612. A basic input/output system (BIOS) 614 can reside in ROM 610 containing the basic routines that help to transfer information among elements within computing system 600.

Computing system 600 can include a hard disk drive 616, magnetic disk drive 618, e.g., to read from or write to removable disk 620, and an optical disk drive 622, e.g., for reading CD-ROM disk 624 or to read from or write to other optical media. Hard disk drive 616, magnetic disk drive 618, and optical disk drive 622 are connected to system bus 606 by a hard disk drive interface 626, a magnetic disk drive interface 628, and an optical drive interface 630, respectively. The drives and associated computer-readable media provide nonvolatile storage of data, data structures, and computer-executable instructions for computing system 600. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein. The computing system 600 can include a GPU interface 658, which can be used for interface for interfacing with a GPU 660. In some examples, the GPU 660 can correspond to the GPU 218, as shown in FIG. 1. In further examples, the computing system 600 includes the GPU 660.

A number of program modules may be stored in drives and RAM 610, including operating system 632, one or more application programs 634, other program modules 636, and program data 638. For example, the RAM 610 can include the compositing engine 100, as shown in FIG. 1 or the compositing engine 216, as shown in FIG. 1. In further examples, the program data 632 can include video frames (e.g., the video frames 112, as shown in FIG. 1), scene related information frames (e.g., the scene related information frames 114, as shown in FIG. 1), digital asset data (e.g., the digital asset data 116, as shown in FIG. 1), video frame latency data (e.g., the video frame latency data 124, as shown in FIG. 1), and other data as disclosed herein.

A user may enter commands and information into computing system 600 through one or more input devices 640, such as a pointing device (e.g., a mouse, touch screen), keyboard, microphone, joystick, game pad, scanner, and the like. For example, the one or more input devices 640 can be used to provide the video frame latency data, as disclosed herein. These and other input devices are often connected to processing unit 602 through a corresponding port interface 642 that is coupled to the system bus, but may be connected by other interfaces, such as a parallel port, serial port, or universal serial bus (USB). One or more output devices 644 (e.g., display, a monitor, printer, projector, or other type of displaying device) is also connected to system bus 606 via interface 646, such as a video adapter.

Computing system 600 may operate in a networked environment using logical connections to one or more remote computers, such as remote computer 648. Remote computer 648 may be a workstation, computer system, router, peer device, or other common network node, and typically includes many or all the elements described relative to computing system 600. The logical connections, schematically indicated at 650, can include a local area network (LAN) and a wide area network (WAN). When used in a LAN networking environment, computing system 600 can be connected to the local network through a network interface or adapter 652. When used in a WAN networking environment, computing system 600 can include a modem, or can be connected to a communications server on the LAN. The modem, which may be internal or external, can be connected to system bus 606 via an appropriate port interface. In a networked environment, application programs 634 or program data 638 depicted relative to computing system 600, or portions thereof, may be stored in a remote memory storage device 654.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

As used herein, the term "or" is intended to be inclusive, rather than exclusive. Unless specified otherwise, "X employs A or B" is intended to mean any of the natural incisive permutations. That is, if X employs A; X employs B; or X employs both A and B, the "X employs A or B" is satisfied. As used herein, the terms "example" and/or "exemplary" are utilized to delineate one or more features as an example, instance, or illustration. The subject matter disclosed herein is not limited by such examples. Additionally, any aspects, features, and/or designs disclosed herein as an "example" or as "exemplary" are not necessarily intended to be construed as preferred or advantageous. Likewise, any aspects, features, and/or designs disclosed herein as an "example" or as "exemplary" is not meant to preclude equivalent embodiments (e.g., features, structures, and/or methodologies) known to one of ordinary skill in the art.

Understanding that is not possible to describe each and every conceivable combination of the various features (e.g., components, products, and/or methods) disclosed herein, one of ordinary skill in the art can recognize that many further combinations and permutations of the various embodiments disclosed herein are possible and envisaged. Furthermore, as used herein, the terms "includes," "has," "possesses," and/or the like are intended to be inclusive in a manner similar to the term "comprising" as interpreted when employed as a transitional word in a claim.

What have been described above are examples. It is, of course, not possible to describe every conceivable combination of components or methods, but one of ordinary skill in the art will recognize that many further combinations and permutations are possible. Accordingly, the present disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means "based at least in part on."

The terms "about" and "approximately" can be used to include any numerical value that can vary without changing the basic function of that value. When used with a range, "about" and "approximately" also disclose the range defined by the absolute values of the two endpoints. e.g. "about 2 to about 4" also discloses the range "from 2 to 4." Generally, the terms "about" and "approximately" may refer to plus or minus 5-10% of the indicated number.

The invention claimed is:

1. A computer-implemented method comprising:
   identifying a video frame from video frames provided by a video camera being used to film a scene stored in a cache memory space based on video frame latency data, the video frame latency data specifying a number of video frames to be stored in the cache memory space before the video frame is identified, the video frames being provided by the video camera at a different frequency than scene related information frames are provided by a scene capture device being used to capture information relevant to filming of the scene, each scene related information frame including a timestamp generated based on a local clock of the scene capture device;
   updating a timestamp of each of the scene related information frames based on a network latency of a network over which the scene related information frames are provided;
   identifying a scene related information frame of the scene related information frames based on an evaluation of the updated timestamp of each the scene related information frames and a timecode of the video frame; and
providing a composited video frame based on the video frame, the digital asset data, and the scene related information frame.

2. The computer-implemented method of claim 1, further comprising:
partitioning the cache memory space into a number of partitions;
storing the video frames in a first set of partitions; and
storing the scene related information frames in a second set of partitions.

3. The computer-implemented method of claim 2, further comprising storing the digital asset data in a third set of partitions.

4. The computer-implemented method of claim 2, wherein the first set of partitions includes even and odd video frame cache locations, and the video frames are stored in one of the even and odd video frame cache locations based on frame numbers assigned to the video frames.

5. The computer-implemented method of claim 1, wherein the scene related information frames are provided over the network from different types of scene capture devices used for capturing information relevant to filming of the scene being captured by the video camera.

6. The computer-implemented method of claim 1, wherein the network is a wireless network.

7. The computer-implemented method of claim 1, wherein said providing comprises updating a virtual environment representative of the scene captured by the video camera based on the scene related information frame, the composited video frame being further generated based on the updated virtual environment.

8. The computer-implemented method of claim 1, wherein the timestamp is further updated based on a frame delta value representative of an amount of time between each scene related information frame.

9. The computer-implemented method of claim 1, wherein a number of composited video frames are provided by repeating the identifying steps to provide augmented video data, the augmented video data further provided based on the digital asset data to include a digital asset, and wherein a controller is configured to provide controller data characterizing facial and/or body movements of the digital asset in the augmented video data.

10. The computer-implemented method of claim 9, wherein the video frame latency data is provided in response to user input at an input device.

11. A system for providing augmented video data comprising:
memory to store machine-readable instructions and data;
one or more processors to access the memory and execute the machine-readable instructions, the machine-readable instructions comprising:
a video frame retriever to retrieve a video frame from video frames provided by a video camera being used to film a scene from the memory based on video frame latency data, the video frame latency data specifying a number of video frames to be stored in the memory before the video frame is identified, the video frames being provided by the video camera at a different frequency than scene related information frames are provided by a scene capture device being used to capture information relevant to filming of the scene, each scene related information frame including a timestamp generated based on a local clock of the scene capture device, wherein the timestamp of each the scene related information frames is updated based on a network latency of a network over which the scene related information frames are provided;
a scene related frame retriever to retrieve a scene related information frame of the scene related information frames from the memory based on an evaluation of the updated timestamp of each of the scene related information frames and a timecode of the video frame;
a digital asset retriever to retrieve digital asset data from the memory characterizing a digital asset; and
a digital compositor to provide augmented video data with the digital asset based on the digital asset data, the scene related information frame, and the video frame.

12. The system of claim 11, the machine readable instructions comprising a data loader to receive the video frames from the video camera capturing the scene, and the scene related information frames from different scene capture devices being used to capture the information relevant to the filming of the scene, the different scene capture devices including the scene capture device.

13. The system of claim 11, wherein the timestamp is further updated based on a frame delta value representative of an amount of time between each scene related information frame.

14. The system of claim 13, further comprising a controller to provide controller data characterizing facial and/or body movements of the digital asset in the augmented video data, the digital compositor providing the digital asset in the augmented video data with facial and/or body movements commensurate with the facial and/or body movements characterized by the controller data.

15. A computer-implemented method comprising:
identifying a video frame from video frames representative of a scene provided by a video camera during production of a film based on video frame latency data, the video frame latency data specifying a number of video frames to be stored in memory of a computing platform before the video frame identified, the video frames being provided by the video camera at a different frequency than scene related information frames are provided by a scene capture device being used to capture information relevant to filming of the scene, each scene related information frame including a timestamp generated based on a local clock of the scene capture device, wherein the timestamp of each the scene related information frames is updated based on a network latency of a network over which the scene related information frames are provided;
identifying a scene related information frame of the scene related information frames based on an evaluation of the updated timestamp of each of the scene related information frames and a timecode of the video frame, wherein the timestamp of each of the scene related information frames is further updated based on a frame delta value representative of an amount of time between respective scene related information frames of the scene related information frames; and
providing augmented video data with a digital asset based on the scene related information frame and the video frame.

16. The computer-implemented method of claim 15, wherein the digital asset has facial and/or body movements based on controller data provided by a controller.

* * * * *